F. S. MARTIN.
COMMUTATOR FOR DYNAMO ELECTRIC MACHINES.
APPLICATION FILED OCT. 18, 1909.

1,007,469.

Patented Oct. 31, 1911.

WITNESSES:
Fred H. Miller

INVENTOR
Frederick S. Martin
BY
ATTORNEY

UNITED STATES PATENT OFFICE.

FREDERICK S. MARTIN, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

COMMUTATOR FOR DYNAMO-ELECTRIC MACHINES.

1,007,469.  Specification of Letters Patent.  Patented Oct. 31, 1911.

Application filed October 18, 1909. Serial No. 523,125.

*To all whom it may concern:*

Be it known that I, FREDERICK S. MARTIN, a citizen of the United States, and a resident of Edgewood Park, in the county of Allegheny and State of Pennsylvania, have invented a new and useful Improvement in Commutators for Dynamo-Electric Machines, of which the following is a specification.

My invention relates to commutators for dynamo-electric machines, and it has for its object to provide a simple and durable means for securing the commutator bars or segments in position and effectively prevent the displacement of the bars when the machine is operating.

As heretofore constructed, commutators for dynamo-electric machines have usually comprised a plurality of bars or segments provided with V-shaped end notches and mounted upon a bushing or sleeve having a V-shaped annular projection at its inner end and a so called "V-ring" adjustably mounted on its outer end for clamping the bars in position.

According to my present invention, I provide a plurality of clamping rings which are so arranged that only one surface of each ring engages a surface of the assembled commutator bars, the other surface of the V-ring being adjacent to a second ring and the two rings together corresponding to the single V-ring of the prior art. By this means, I secure a more perfect contact between the bars or segments and the rings and so prevent the displacement or vibration of the bars when the commutator is in operation. Each of the ring segments is separately adjustable and one of the clamping nuts is so mounted upon the other that the two serve to lock each other in position.

Figure 1:
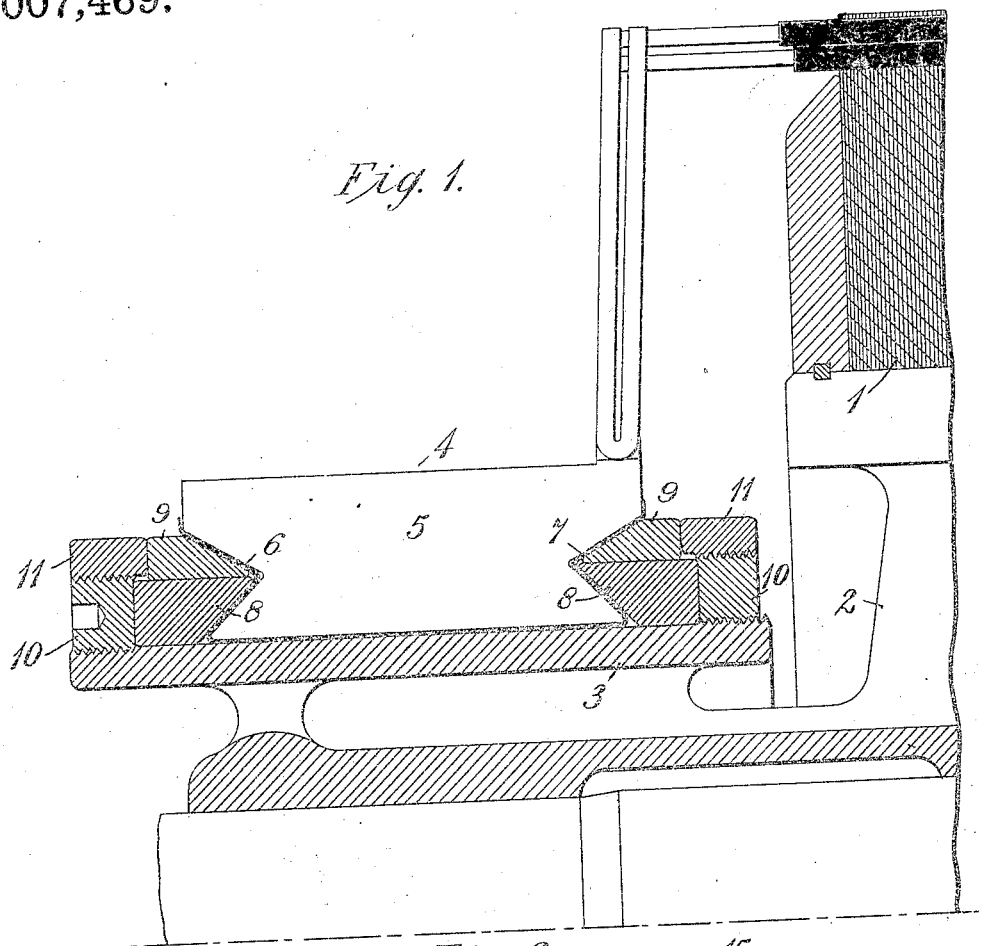
Figure 2:
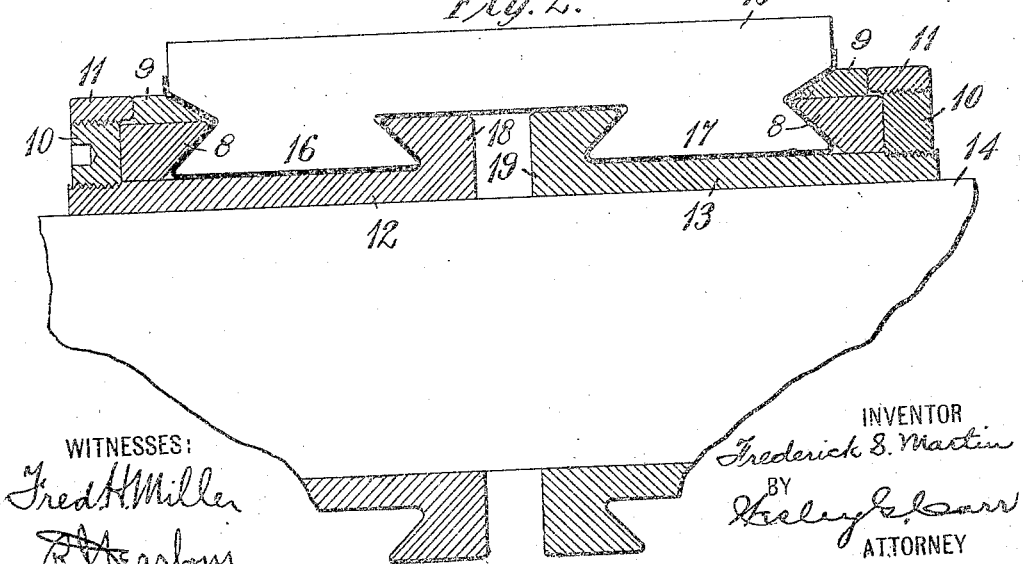

Figure 1 of the accompanying drawings is a sectional elevation of a portion of a dynamo-electric machine embodying my invention. Fig. 2 is a view corresponding to Fig. 1, but illustrating a structure which is specially adapted for long, high-speed commutators such as are embodied in direct current turbo-generators.

Referring to the drawings, the structure here shown comprises a magnetizable core member 1, a supporting frame or spider 2, a cylindrical projection or sleeve 3 and a commutator cylinder 4 which is mounted on said projection or sleeve. The commutator cylinder 4 comprises a plurality of segments 5, each of which has V-shaped notches 6 and 7 in its respective ends. Two concentric clamping rings 8 and 9 project into the annular recess formed by the V-shaped notches at each end of the cylinder and two concentric clamping nuts 10 and 11 are mounted upon each end of the projection 3 to engage the concentric rings and force them into the notches 6 and 7. The two sets of clamping nuts 10 and 11 are similar and each inner nut 10 is screw-threaded upon one end of the sleeve 3 and the outer nut 11 is screw-threaded upon the inner nut 10. The nuts 10 serve to adjust the rings 8 and the nuts 11 to adjust the rings 9. It will be understood that means other than those specifically shown and described may be employed for adjusting the rings 8 and 9, if desired.

The above described commutator may be assembled as follows: One set of concentric nuts is first located in position on the inner end of the sleeve 3 and one set of concentric rings is next located adjacent to the nuts. The commutator segments are then assembled in radial planes about the outer cylindrical surface of the sleeve 3, the notches 7 being in engagement with the concentric rings. The ring 8 of the set at the outer end is then placed in position on the sleeve to engage the inner surface of the annular groove formed by the notches 6. The ring 9 of the same set is then mounted directly on the ring 8 to engage the outer surface of the same annular groove. The nut 10 of the outer set is then screwed upon the end of the sleeve 3 and is forced into engagement with the ring 8, which, in turn, tends to draw the commutator bars inwardly, and, since they are wedge shaped in section in the usual manner, they are clamped firmly together as a cylindrical body. The nut 11 is then screwed upon the threaded surface of the clamping nut 10 to force the ring 9 inwardly, the arrangement of parts being such that this ring tends to act in opposition to the inner ring segment and, consequently, the bars or segments of the commutator are securely locked against vibration.

It will be readily understood by those familiar with the art that when dynamo-electric machines are operating at very high speeds the centrifugal forces to which the commutators are subjected are often very great and tend to displace the bars. It is therefore essential to get an excellent contact surface between the clamping rings and the annular grooves formed by the notches in the commutator segments. It is obviously extremely difficult to get an equal pressure between the two surfaces of an integral V-shaped ring and the groove in the commutator cylinder.

In Fig. 2, the usual commutator bushing is replaced by a pair of similar bushings 12 and 13 which are fitted upon the shaft 14 of a dynamo-electric machine, and each of the commutator bars 15 is provided with dove-tail projections 16 and 17. The bushings 12 and 13 are provided with V-shaped projections 18 and 19 at their adjacent ends and with concentric rings 8 and 9 and clamping nuts 10 and 11 at their outer ends, which securely clamp the dove-tail projections between the V-shaped projections of the bushings and the concentric rings and hold the commutator bars in position against the centrifugal forces to which the commutator is subjected in operation. The bushings 12 and 13 may be fitted upon a single sleeve instead of being placed directly on the shaft 14 if it is desired to provide for removing the shaft without disturbing the commutator.

I desire that structural modifications which do not depart from the spirit of my invention shall be included within its scope.

I claim as my invention:

1. A commutator for dynamo-electric machines comprising a plurality of bars or segments having registering notches of V shape to form an annular groove and concentric superposed clamping rings seated in said groove and independently adjustable to secure the bars in position.

2. A commutator for dynamo-electric machines comprising a plurality of bars or segments having registering notches of V shape in their ends to form annular grooves and concentric superposed clamping rings seated in each groove and independently adjustable for securing the parts in position.

3. A commutator for dynamo-electric machines comprising a sleeve or bushing, a plurality of bars or segments radially mounted thereon and two pairs of superposed concentric V-shaped rings for clamping the bars in position, each of the bars being notched at its ends to provide annular V-shaped grooves in the assembled structure to receive the rings.

4. A commutator for dynamo-electric machines comprising a sleeve or bushing, a plurality of bars or segments, two sets of superposed concentric clamping rings therefor and means for independently adjusting each of the clamping rings of each set.

5. A commutator for dynamo-electric machines comprising a sleeve or bushing, a plurality of bars or segments, two sets of concentric clamping rings therefor and means for independently adjusting each of the clamping rings of each set, the inner rings of said sets tending to draw the bars together and the outer rings tending to force them radially outward.

6. A commutator for dynamo-electric machines comprising a sleeve or bushing, a plurality of bars or segments, two sets of superposed concentric clamping rings therefor and two sets of superposed concentric clamping nuts screwed upon the sleeve or bushing at its respective ends and severally adapted to engage the respective rings.

In testimony whereof, I have hereunto subscribed my name this 6th day of Oct., 1909.

FREDERICK S. MARTIN.

Witnesses:
R. J. DEARBORN,
B. B. HINES.